United States Patent [19]

Tsukiji

[11] Patent Number: 4,629,201
[45] Date of Patent: Dec. 16, 1986

[54] LOCKING STRUCTURE OF A SEAT TO A FUEL TANK IN A STRADDLE TYPE VEHICLE

[75] Inventor: Kensuke Tsukiji, Asaka, Japan

[73] Assignee: Honda Giken Kogyo Kabushiki Kaisha, Tokyo, Japan

[21] Appl. No.: 776,288

[22] Filed: Sep. 16, 1985

[30] Foreign Application Priority Data

Sep. 17, 1984 [JP] Japan ............................. 59-139336[U]

[51] Int. Cl.⁴ .............................................. B62K 11/04
[52] U.S. Cl. .................................... 280/5 A; 180/219; 297/195
[58] Field of Search ............... 180/219, 225; 280/5 A, 280/289 R; 297/195; 403/407.1, 406.1

[56] References Cited

U.S. PATENT DOCUMENTS 1,432,349 10/1922 McFarland ........................ 403/407.1
4,457,524  7/1984 Yoshiwara ............................ 180/219

Primary Examiner—David M. Mitchell
Assistant Examiner—Donn McGiehan
Attorney, Agent, or Firm—Armstrong, Nikaido, Marmelstein & Kubovcik

[57] ABSTRACT

An improved locking structure for detachably locking a front portion of a seat to a fuel tank in a straddled type vehicle in which the fuel tank is disposed in front of the seat, is disclosed. The locking structure comprises a fixed stay having a locking pin projected from its rear upper surface and provided with an opening in its front portion, said fixed stay being adapted to be fixedly secured to the fuel tank by means of a bolt passing through the opening under the state where the fixed stay is butted against the rear upper surface of the fuel tank, and a bifurcated slide stay having a bifurcated front portion that is engageable with the locking pin and adapted to be fixedly and integrally secured to a front lower surface of bottom plate of the seat.

2 Claims, 9 Drawing Figures

LOCKING STRUCTURE OF A SEAT TO A FUEL TANK IN A STRADDLE TYPE VEHICLE

BACKGROUND OF THE INVENTION

1. Field of the Invention

The present invention relates to a locking structure adapted for detachably locking a seat to a fuel tank to be mounted on a straddled type vehicle, especially a motorcycle.

2. Description of the Prior Art

In the heretofore known straddled type vehicle having a fuel tank 02 made of synthetic resin disposed in front of a seat 01, as shown in FIG. 1, a nut 03 was integrally buried in a rear upper wall portion of the fuel tank 02, and the seat 01 was mounted to a vehicle body by detachably engaging a bifurcated slide stay 07 of a bottom plate 06 of the seat 01 with a locking pin 05 which is threadedly mated with the nut 03 by the intermediary of a collar 04 and fixing the rear portion of the seat 01 to a vehicle body frame not shown.

However, since the front end position of the seat 01 and the buried position of the nut 03 are restrained in view of design of the vehicle body appearance, the locking pin 05 and the bifurcated slide stay 07 are positioned close to the front end of the seat 01. Consequently, when the front portion of the seat 01 has been butted against the rear upper surface of the fuel tank 02 under the state where the seat 01 is shifted backwards by a distance approximately equal to the horizontal length of the bifurcated slide stay 07 with respect to the mount position of the seat in order to mount the seat 01, sometimes a front cushion 01a of the seat 01 would be caught by the locking pin 05, and as a result, even if it is tried to move the seat 01 forwards to engage the bifurcated slide stay 07 with the locking pin 05, it would be difficult to move the seat 01.

SUMMARY OF THE INVENTION

It is therefore one object of the present invention to provide a locking structure of a seat to a fuel tank in a straddled type vehicle in which the above-mentioned difficulty possessed by the structure in the prior art has been overcome.

A more specific object of the present invention is to provide a novel locking structure of a seat to a fuel tank in a straddled type vehicle, in which when a front portion of a seat is locked to a rear portion of a fuel tank by sliding the seat from the rear, the front cushion of the seat would not be caught by the locking pin and hence the forward movement of the seat would not be prevented.

According to one feature of the present invention, there is provided a locking structure which can detachably lock a front portion of a seat to a fuel tank is a straddled type vehicle in which the fuel tank is disposed in front of the seat, which locking structure comprises a fixed stay having a locking pin projected from its rear upper surface and provided with an opening in its front portion, said fixed stay being adapted to be fixedly secured to the fuel tank by means of a bolt passing through th opening under the state where the fixed stay is butted against the rear upper surface of the fuel tank, and a bifurcated slide stay having a bifurcated front portion that is engageable with the locking pin and adapted to be fixedly and integrally secured to a front lower surface of a bottom plate of the seat.

Since the seat locking structure according to the present invention is constructed in the above-described manner, the seat cushion secured to the front end lower surface of the bottom plate of the seat would not be caught by a head of a screw and hence the forward movement of the seat would not be prevented in distinction from the heretofore known structure in which a bifurcated portion fixed to the seat would slide forwards as engaged with a pin itself threadedly secured to a fuel tank, and therefore, engagement and disengagement between the seat and the fuel tank can be carried out quickly, easily and reliably.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENT

In the following, description will be made on one preferred embodiment of the present invention illustrated in the accompanying drawings.

Figure 1:
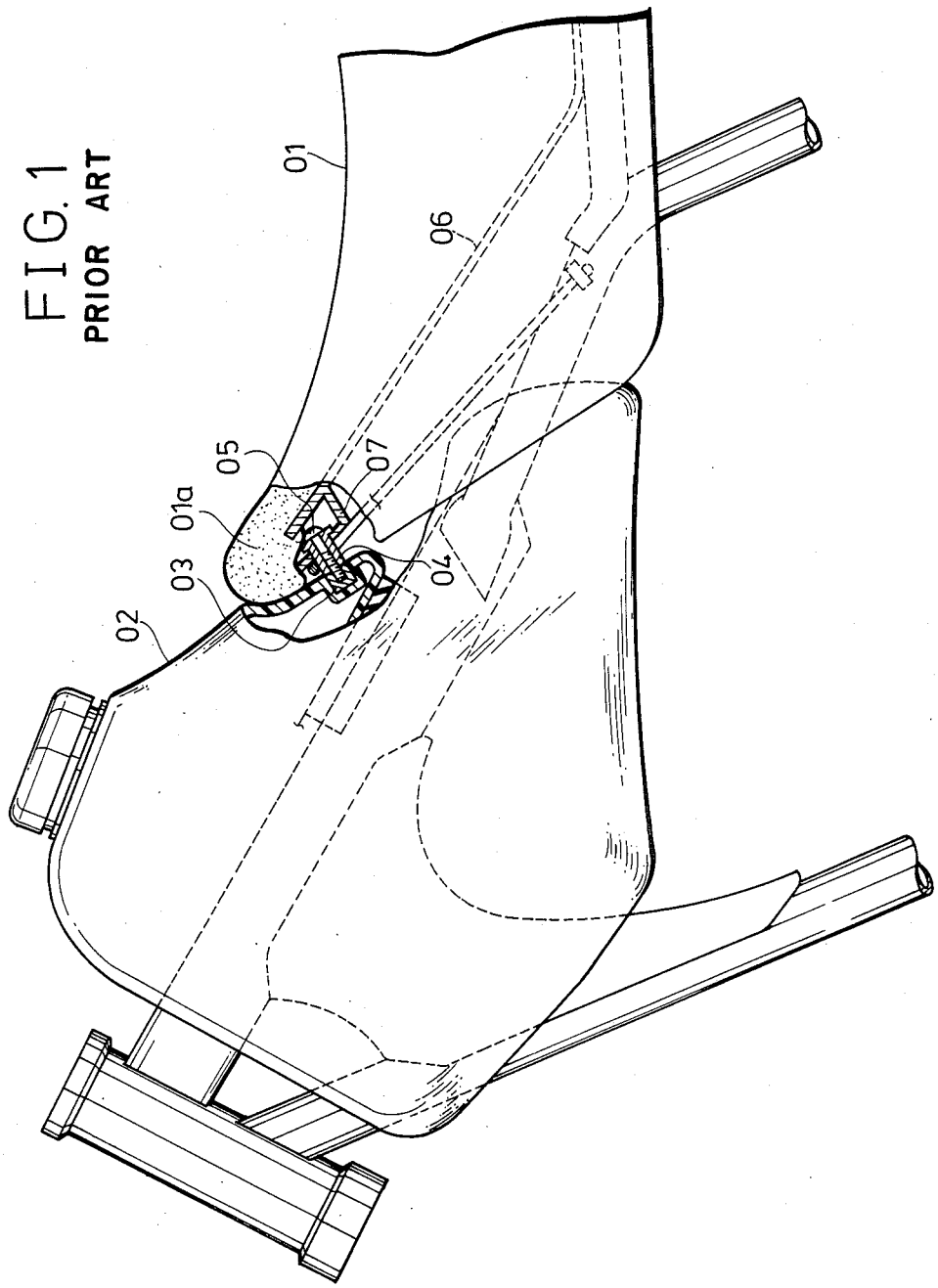
FIG. 1 is a schematic view of an essential part of a motocycle showing a known seat locking structure.
Figure 2:
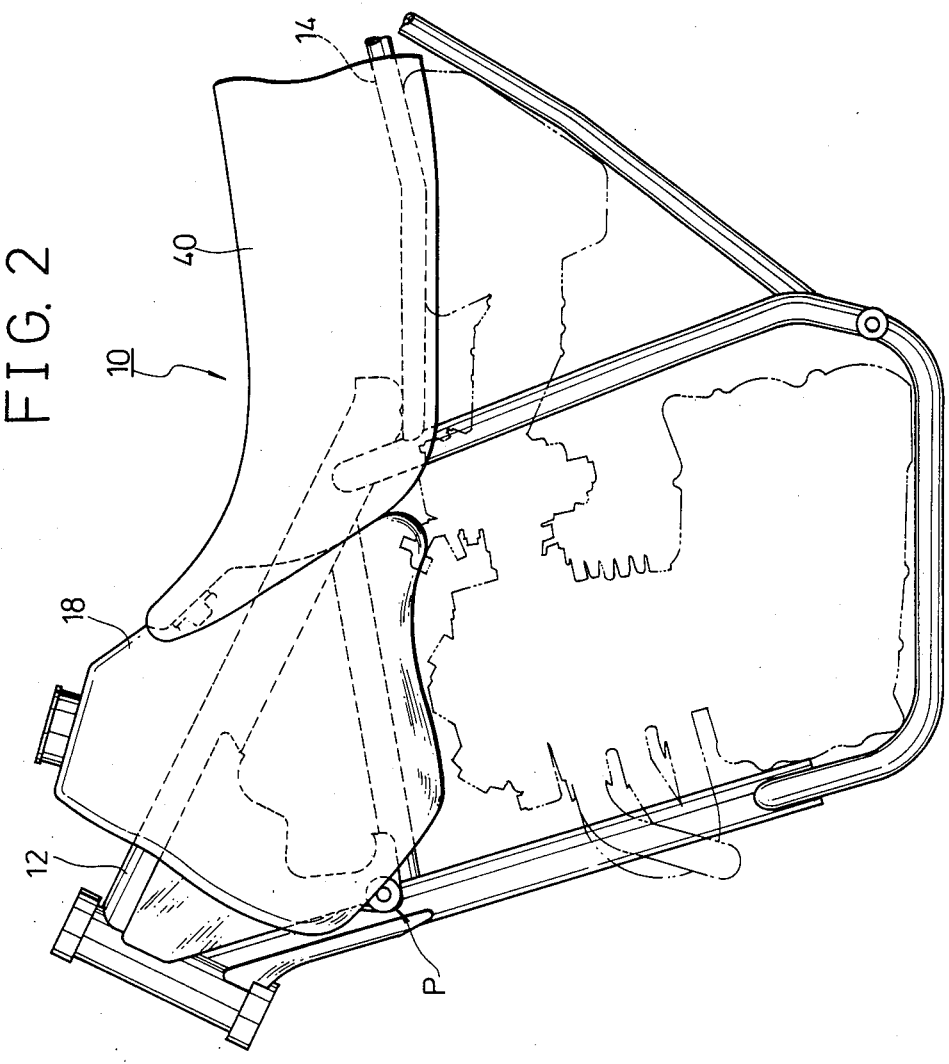
FIG. 2 is a left side schematic front view of an essential part of a vehicle body of a motorcycle, in which a seat locking structure according to one preferred embodiment of the present invention is employed.

FIG. 2 schematically shows a motorcycle 10 in a front view on the left side of the vehicle body. A fuel tank 18 of the motorcycle 10 is made of synthetic resin, and is disposed so as to straddle a vehicle body frame 12. The front portion of the fuel tank 18 is fixedly secured to the vehicle body frame 12 at point P by means of a screw, and also its rear portion is fixed to the vehicle body frame 12 by means of a fixing band 16 made of rubber (See FIG. 3). A seat 40 covering the rear upper surface of the fuel tank 18 is detachably placed on a pair of left and right frame members 14, and is locked to the fuel tank 18 at its front end portion.

Figure 3:
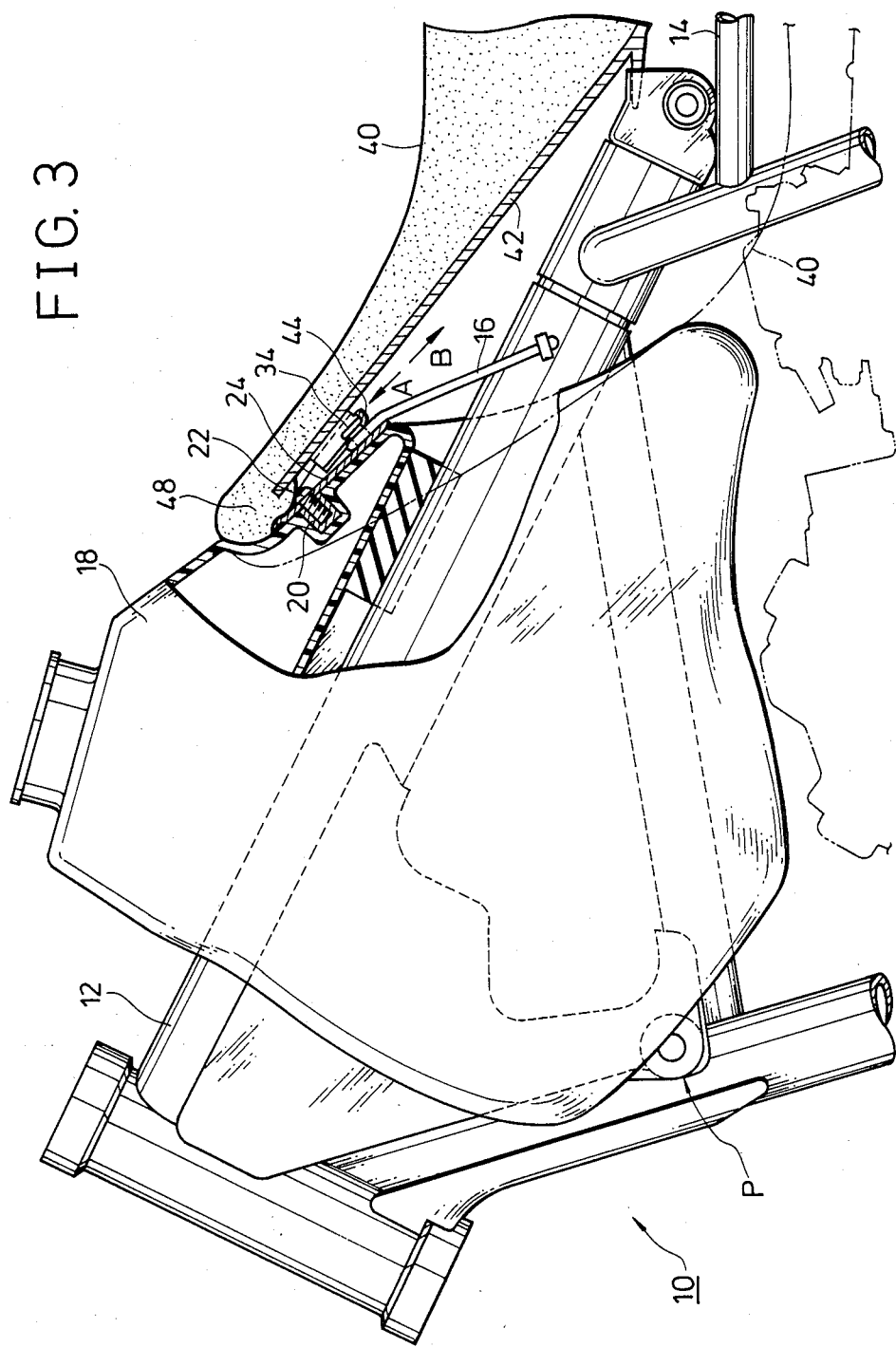
FIG. 3 is an enlarged cross-section view of the seat locking structure in FIG. 2.

Now, description will be made on the locking structure between the fuel tank 18 and the seat 40 (See FIG. 3). At the central portion in the widthwise direction of the vehicle body, the upper surface of the rear portion of the fuel tank 18 is formed lower than the other portion in a step-like manner, and a nut 20 is buried in that central portion. Thus, a fixed stay 24 is fixedly secured to the fuel tank 18 by threadedly engaging a bolt 22 with this box nut 20.

Figure 4:
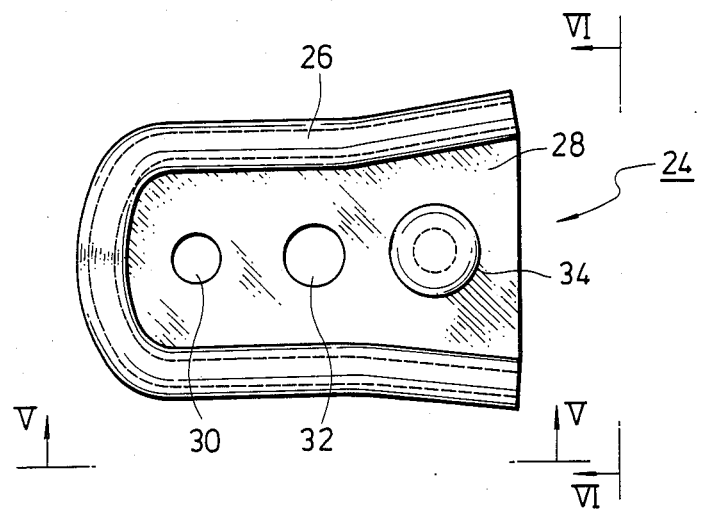
FIG. 4 is a plan view of a fixed stay in the seat locking structure in FIG. 3.
Figure 5:
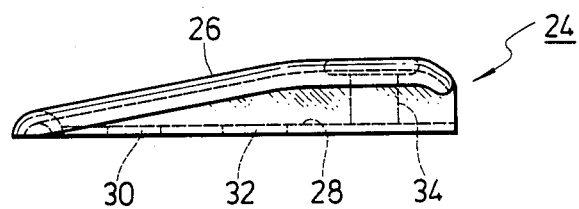
FIGS. 5 and 6, respectively, are a front view and a side view of the fixed stay taken along line V—V and line VI—VI in FIG. 4 as viewed in the direction of arrows.
Figure 6:
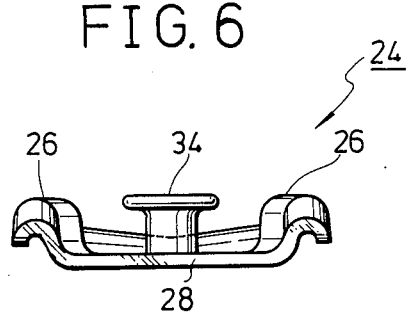

As shown in FIGS. 4 to 6 (FIGS. 5 and 6 being a front view and a side view, respectively, taken along line V—V and line VI—VI in FIG. 4 as viewed in the direction of arrows), a peripheral portion 26 of the fixed stay 24 is projected upwards as bent in an inverse U-shape, and a relatively depressed base wall 28 is provided with openings 30 and 32 and a headed locking pin 34 not exceeding the top level of the peripheral portion 26. The opening 30 is provided for the purpose of passing the bolt 22 therethrough.

Figure 7:
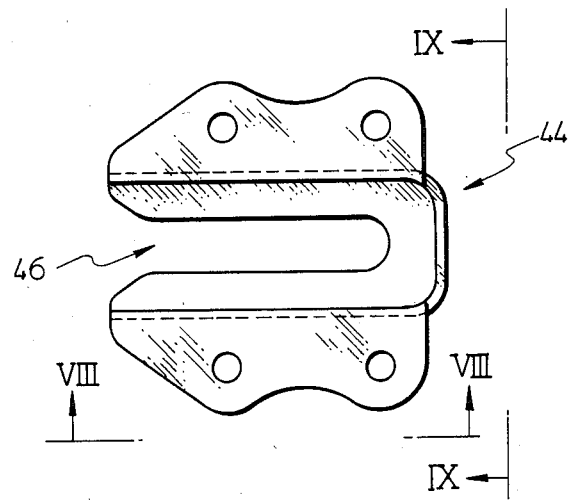
FIG. 7 is a plan view of a bifurcated slide stay to be engaged with the locking pin of the fixed stay as viewed from the side of the surface coming into contact with the bottom plate of the seat.
Figure 8:
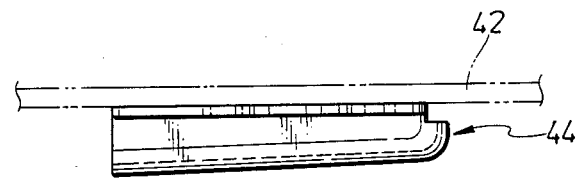
FIGS. 8 and 9, respectively, are a front view and a side view of the bifurcated slide stay taken along line VIII—VIII and line IX—IX in FIG. 7 as viewed in the direction of arrows.
Figure 9:
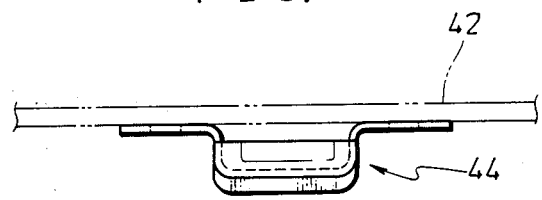

On the other hand, a bottom plate 42 of the seat 40 is integrally provided with a bifurcated slide stay 44 on the lower surface of its front portion (as fixedly secured by rivets) as shown in FIGS. 7 to 9 (FIGS. 8 and 9 being a front view and a side view, respectively, taken along line VIII—VIII and line IX—IX in FIG. 7 as viewed in the direction of arrows), and the front portion of the seat 40 can be positioned and fixed relative to the fuel tank 18 by engaging the bifurcated slide stay 44 with the locking pin 34 so that the locking pin 34 may be located in a slot 46 at the center of the bifurcated portion of the bifurcated slide stay 44.

It is to be noted that the above-mentioned fixing band 16 is engaged with the locking pin 34, and so, it functions as a shock absorber of the bifurcated slide stay 44 for the base ball 28.

The locking structure according to this prefered embodiment is constructed in the above-described manner, and when it is intended to lock the seat 40 to the fuel tank 18, the bifurcated slide stay 44 is moved in the direction of arrow A (See FIG. 3) to be engaged with the lock pin 34, while when it is desired to release the seat 40 from the fuel tank 18, the bifurcated slide stay 44 is moved in the direction of arrow B (see FIG. 3) to be disengaged from the lock pin 34.

According to the present invention, since the structure in which the bifurcated slide stay 44 of the seat 40 is not engaged with the bolt 22 but is engaged with the locking pin 34 positioned behind the bolt 22, is employed, when the bifurcated slide stay 44 is engaged with the locking pin 34 by moving the seat 40 forwards (in the direction of arrow A), a seat cushion 48 attached to the front end lower surface portion of the bottom plate 42 of the seat 40 would not interfere the engagement between the locking pin 34 and the bifurcated slide stay 44, and therefore, mounting of the seat 40 can be carried out quickly.

In addition, with regard to the fixed stay 24, since the head top surfaces of the locking pin 34 as well as the bolt 22 do not exceed the top level of the peripheral portion 26 (see FIGS. 3, 5 and 6), when the bifurcated slide stay 44 is engaged with the locking pin 34, the seat cushion 48 would not be caught by the head portion of the locking pin 34 or the bolt 22, and so, the durability of the seat cushion 48 can be enhanced.

Furthermore, as the peripheral portion 26 of the fixed stay 24 is formed in an inverse U-shape in cross-section, even if the seat cushion 48 should be brought into contact with the peripheral portion 26 upon mounting or dismounting the seat 40, the seat cushion would not suffer a damage.

As will be apparent from the above description, according to the present invention, since the structure is employed such that an opening is provided in a front portion of a fixed stay having a locking pin projected from its upper surface in a rear portion, a bolt is threadedly mated with a fuel tank through the opening under the state where the fixed stay is butted against the rear upper surface of the fuel tank to thereby fix the fixed stay, and a bifurcated slide stay on a bottom surface of seat which was engaged with the bolt in the prior art is engaged with a locking pin located behind the bolt, a seat cushion attached to the lower surface of the front end of the bottom plate of the fuel tank would not interfere the engagement of the bifurcated slide stay with the locking pin, and also, the seat cushion would not be caught by the bolt which need not lock the bifurcated slide stay. Accordingly, it is possible to carry out mounting of the seat quickly.

While the principle of the present invention has been described above in connection to a preferred embodiment of the invention, as a matter of course, the present invention should not be limited to the illustrated embodiment, but many changes and modifications in design could be made to the illustrated construction without departing from the spirit of the present invention.

What is claimed is:

1. A locking structure for detachably locking a front portion of a seat to a fuel tank in a straddled type vehicle in which a fuel tank is disposed in front on said seat, comprising a fixed stay having a headed locking pin projected from its rear upper surface, an opening provided in its front portion and a peripheral portion projected upwards on the front and sides of said fixed stay and forming an angled opening toward the rear, said fixed stay being fixedly secured to said fuel tank by means of a bolt passing through said opening where said fixed stay is butted against the rear upper surface of said fuel tank, said headed locking pin projecting above said stay to a height not exceeding the top of said peripheral portions, and a bifurcated slide stay fixedly and integrally secured to a front lower surface of a bottom plate of said seat and having a bifurcated portion opening forwardly and engagable with said headed locking pin, whereby said bifurcated slide stay positons and locks the front portion of said seat by sliding forwardly as guided by said headed locking pin.

2. A locking structure as claimed in claim 1, in which a rear portion of said fuel tank is fixed to a vehicle body frame by means of a fixing elastic band, and a front end of said fixing elastic band is engaged with said locking pin to thereby function as a shock absorber between said bifurcated slide stay and said fixed stay.

* * * * *